Jan. 25, 1966  R. L. DEGA ETAL  3,230,801
APPARATUS FOR MACHINING ELASTOMERIC MATERIALS
Filed Aug. 15, 1963  2 Sheets-Sheet 1

INVENTORS
Robert L. Dega, &
BY  James F. Tesch
E. W. Christen
ATTORNEY

INVENTORS
Robert L. Dega, &
BY James F. Tesch

E.W. Christen
ATTORNEY

United States Patent Office 3,230,801
Patented Jan. 25, 1966

3,230,801
APPARATUS FOR MACHINING ELASTOMERIC MATERIALS
Robert L. Dega, Utica, and James F. Tesch, Farmington, Mich., assignors to General Motors Corporation, Detroit, Mich., a corporation of Delaware
Filed Aug. 15, 1963, Ser. No. 302,350
7 Claims. (Cl. 82—2)

This invention relates to a lathe type apparatus adapted for machining elastomeric materials and more particularly, to such apparatus for machining elastomeric seal stock wherein the stock is cooled to a rigid state enabling it to be machined in the form of a precision lip type shaft seal.

Shaft seals commonly have a metallic annular case to which is bonded or clamped an elastomeric sealing element which includes a head section having an annular sealing lip radially biased by a spring into sealing engagement with a rotating shaft. It is conventional practice to form the sealing element from an annulus of rubber stock by molding it under conditions of heat and pressure. The metal case may be placed in the mold adjacent the stock in which case the stock is vulcanized at the heel portion to a rim of the casing; or where the sealing element is to be clamped to the case, a clamping bead is molded on the heel portion and assembly with the case takes place later. In either case, the seal stock is oversized prior to molding which results in the formation of a radial flash approximately where the seal lip is to be. After molding, this flash is trimmed away by cutting through it at an angle of about 60° from vertical forming a trim surface; the intersection of this trim surface with the molded seal undersurface forming the seal lip. It is usually the objective to have the seal lip trim out a little beyond the center of the spring force line; in other words, where a garter spring is used, the center of the spring groove should be slightly behind the lip.

While this method of seal making is widely practiced and is generally accepted as forming a fairly effective seal for most applications, it may be readily appreciated that accuracy is not its strong point. For example, slight errors due to mold mismatch or misalignment will be magnified in the finished article resulting in a wholly unsatisfactory seal for applications requiring greater accuracy. To illustrate, when the sealing element is molded a little eccentric with the case, a further eccentricity is introduced during the trimming operation. This is because the elastomeric element and metallic case are both spun on a mandrel with the elastic element establishing the rotational axis for the unit, no independent support being given to the case. The result is that the centrifugal effect becomes magnified due to the initial molding eccentricity and the sealing element is easily distorted by the gyrations of the heavier case.

Still another problem introduced by trimming arises from the fact that the cutting knife is pulled through the rubber stock at an angle to the rotational axis forming a conical trim surface. This surface intersects the molded conical seal undersurface at an angle of about 90° to form the lip. Clearly, a small error introduced by the angle of cut or the stretch of the rubber will be magnified at the line of intersection with the possible effect of locating the lip ahead of or too far behind the center of the spring groove; or perhaps worse, trimming a canted lip path which causes the plane of the lip to be inclined to the axis of the seal when assembled on a shaft.

From what has been said, it is apparent that the commercial lip-type seal is far from a precision device and as a result may fail in operation within a relatively short time as a result of these built-in manufacturing defects. For example, failure of a vehicle transmission seal may occur after a few thousand miles of operation resulting in expensive repairs while the transmission as a whole is practically new.

It is a purpose of the present invention to provide apparatus for making a precision shaft seal which will have a prolonged life by eliminating these manufacturing defects. To accomplish this, a revolutionary approach to seal manufacturing was needed. Such a method is described in a copending application entitled, "Method of Machining Lip-Type Seals," S.N. 46,338, filed August 1, 1960. In brief, this new approach involves the concept of lowering the temperature of the elastomeric stock until it becomes rigid, and then machining the "frozen" elastomeric blank with lathe type cutting tools to form a precision lip seal.

With this new method came new problems. The present invention relates to a lathe type apparatus especially adapted to handle the cold conditions encountered by the freeze machining method and briefly includes; lathe type cutting tools adapted to form lip seal configurations on elastomeric stock; a lathe spindle for rotatably supporting the elastomeric stock in a horizontal plane adjacent the cutting tools; and a cooling system associated with the lathe apparatus adapted to convey a liquid coolant onto the elastomeric stock to condition it for machining, the cooling system including a deep walled collector surrounding the rotating stock to provide a cold air basin therefor.

For a better understanding of the inventive apparatus, reference is made to the following description and drawings wherein.

Figure 1:
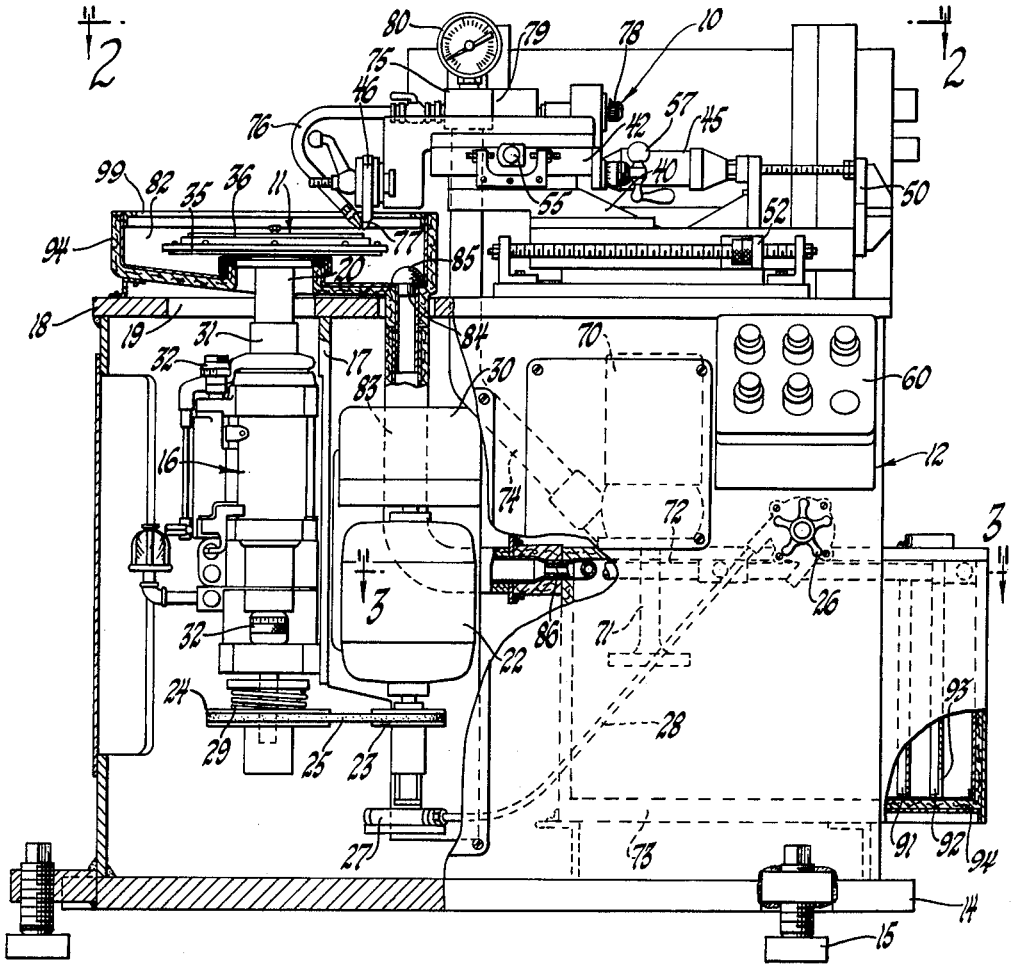
FIGURE 1 is a front elevation of the invention showing the left portion of the cabinet broken away to reveal the spindle area.
Figure 2:
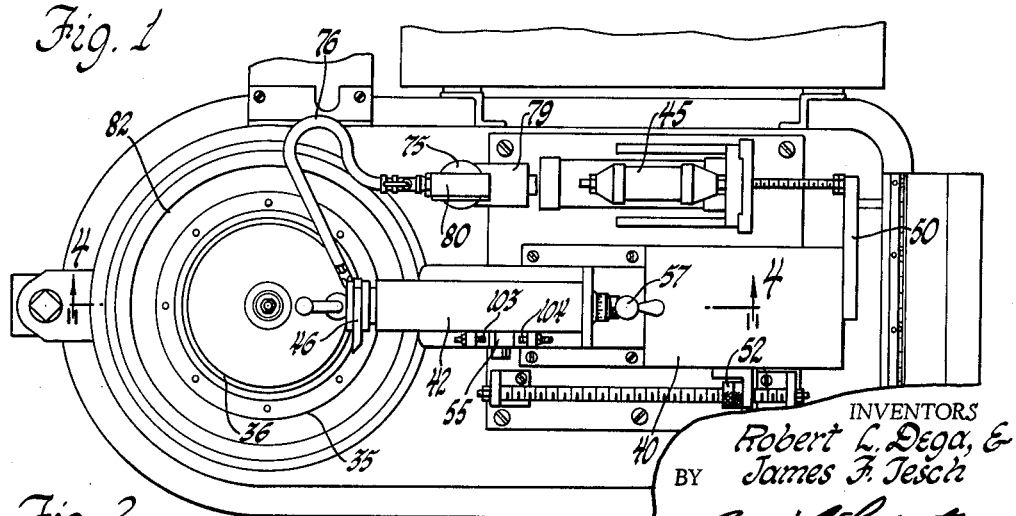
FIGURE 2 is a plan view of the apparatus shown in FIGURE 1 taken along the line 2—2 of FIGURE 1.

Referring to FIGURES 1 and 2, the invention is shown having the general arrangement of lathe type machinery which includes a tool head assembly area 10 adjacent a work area 11 supported on a cabinet 12 at a work level above a base plate 14 supported from the floor by feet 15.

The left portion of the cabinet 12 is broken away to show the spindle unit 16 supported on a web 17 depending from the support table 18 having an opening 19 through which the spindle shaft 20 projects into the work area 11. A constant speed drive motor 22 is mounted within the cabinet adjacent the lower end of the spindle unit 16 and has a variable speed drive pulley arrangement 23 and 24 operatively interconnected by a V-belt 25. A speed selector handle 26 projecting through the front panel of the cabinet operates a screw mechanism 27 by means of a cable 28 to spread or close up the pulley groove of pulley 23, thus causing a biasing spring 29 to correspondingly adjust the spacing of the pulley 24 to vary the drive ratio between the constant speed motor 22 and the spindle 16. A magnetic brake unit 30 is coupled to the motor shaft to bring the spindle to a quick stop to facilitate rapid machining cycles. The shaft 20 has a vertical stroke length of about 4 inches and is adjustable by means of a traveling quill 31 reciprocably received in the spindle unit 16. Vertical length advance and stop knobs 32 control the movement of the quill 31. Supported in the work area 11 and on the shaft 20 above the support table 18 is a chuck 35 adapted to grip the outer flange of the annular metal case of the seal stock 36.

The tool head assembly, shown indexed to the work position, is mounted to the right on the support table 18 and comprises a primary slide 40 and a secondary slide 42. The primary slide 40 is powered by an air cylinder 45 for automatic rough indexing of the tool head 46 over the work area 11. The air cylinder 45 is operatively connected to the primary slide 40 by means of an extension arm 50. A primary slide stop 52 is mounted in front of the primary slide on the support table 18 to establish the rough indexed work position and a two-position tool head stop 55 is mounted adjacent the secondary slide 42 and provides a forward and rear milling stop for precision movement of the tool bits of the tool holder 46, the slide 42 being actuated by means of the crank 57 in a conventional manner.

The above described lathe components are for the most part standard and commercially available machine tool elements which those skilled in machine design will readily recognize. Whether the work rotates with respect to cutting tools or vice-versa, as in a milling machine, would be only a matter of ordinary skill; the machine control also is not regarded as contributing to this invention and is only indicated by a master control panel 60 on the front panel of the cabinet below the work table 18 which may be electrically connected as desired in appropriate circuits in order to effect operation of the various lathe components. For example, provisions may be made for circuits to start and stop the motor 22 and to energize the magnetic brake 30; to initiate the advance and retract stroke of spindle 16; and to cause operation of the air cylinder 45 to index the primary slide 40 between the work and idle positions.

Having now described in more or less general terms the arrangement of a lathe apparatus, our attention now turns to a disclosure of the invention associated therewith.

Referring briefly again to FIGURES 1 and 2, we see outlined behind the front panel within the cabinet area 12 a cooling system which includes a high flow centrifugal pump 70 having an intake 71 projecting through an opening 72 in the cover of a cooling chest 73 mounted on the base 14 in the lower right portion of the cabinet area 12. A discharge conduit 74 connects the outlet of the centrifugal pump 70 to a header 75 which is connected to a flexible hose 76 carrying a spout or tip 77 which directs a fluid coolant against the elastomeric stock 36 in the work area 11. The coolant may be any fluid, preferably a liquid, that retains its fluidity at low temperatures, for example ethylene glycol commonly used as an antifreeze in cooling systems may be used. A thermostatic control knob 78 controls a thermostat 79 associated with the header 75 and may be set to regulate the temperature of the coolant generally between −30 and −40 degrees F. for Buna elastomers, as indicated by the temperature gauge 80. However, the system is capable of temperatures much lower in exceptional cases, for example, in machining silicone elastomers a temperature of about −80 F. is needed and conceivably the system would remain efficient to 100° below zero. A cold air basin and coolant collector 82 surrounds the chuck and seal stock and serves an important function which will be described later.

A return conduit 83 connects at 84 with the bottom of the cold air basin 82 and has a strainer 85 over the opening to prevent machined scrap rubber from contaminating the system. The conduit 83 connects at its lower end 86 to the cooling chest 73.

Figure 3:
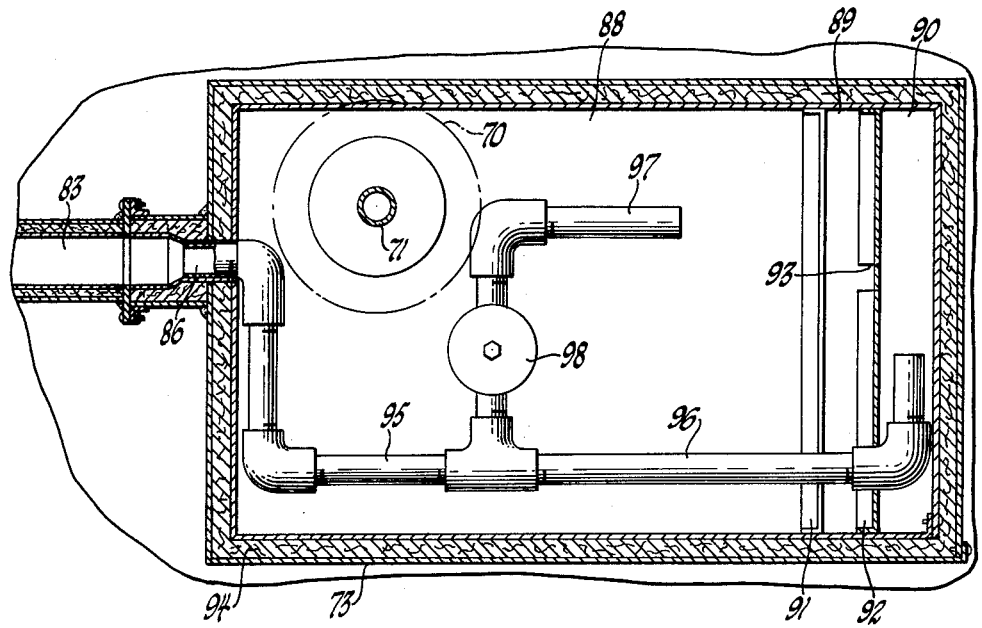
FIGURE 3 is a sectional view of the cooling chest portion of the cooling system taken along the line 3—3 of FIGURE 1.

A sectional view of the cooling chest is shown in FIGURE 3 and includes a main chamber 88, a cold chamber 89, and a return chamber 90 separated by partitions 91 and 92. The cold chamber 89 is designed to contain Dry Ice, but could contain refrigerating coils. The partition 92 has openings 93 along the bottom providing communication between the chambers 89 and 90. The partition 91 extends to within a couple of inches from the cooling chest cover to permit coolant to overflow into the main chamber 88. The return conduit 83 is connected through a reducer at 86 to the cooling chest 73 and communicates with piping 95 having a main line 96 returning the coolant to the chamber 90. A bypass 97 is thermostatically controlled by a solenoid operated valve 98 to allow coolant to spill back into the main chamber 88 under given conditions. The solenoid operated valve 98 is controlled by the thermostat 79 and if the temperature of the coolant rises above a predetermined level, the valve will be closed automatically and all of the coolant will be routed through line 96 to be cooled to the desired temperature. If the temperature of the coolant is maintained within the range required for machining the rubber stock then the valve will remain open allowing some of the coolant to return directly to the main chest 88, bypassing the chamber 90.

The coolant pours into the chamber 90 flowing then through openings 93 evenly filling compartment 89 coming into contact with the Dry Ice and spilling over the top into the main chamber 88. The level of the fluid in chamber 88 will always be above the intake 71 of the pump 70 and as a result, will be continuously pumped through the discharge conduit 74 to be applied to the rotating seal stock by nozzle 76. The basin 82 collects the fluid for return to the cooling chest.

Figure 4:
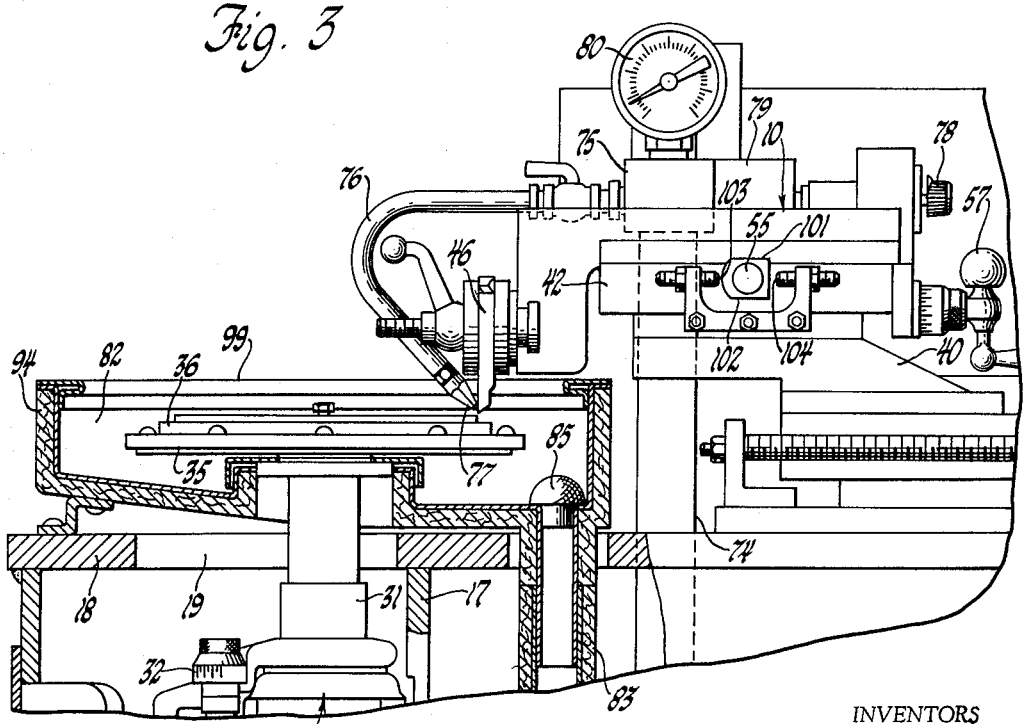
FIGURE 4 is an enlarged view of the work area taken along line 4—4 of FIGURE 2.

Referring particularly to FIGURE 4, it may be seen that the spindle 16 is vertically mounted with respect to the support table 18 and rotates the chuck 35 in a horizontal plane parallel to the work table 18 and more importantly, the spindle unit is not directly supported on the work table but contacts it only indirectly through the depending web 17. Furthermore, the tool head assembly and spindle units are mounted on opposite sides of the work table 18 as close together as possible.

This is important because of the unusual effects on machine tool apparatus that accompany the local chilling and machining of a work piece where the machine as a whole operates at ambient temperatures. It is common in lathe type machinery to mount a tool head assembly on a support table with a power driven chuck assembly mounted opposite and in alignment therewith for rotatably supporting a work piece in a horizontal rotational axis, the cutting of the part being accomplished in that position. We have found that in cooling a work piece on this type of apparatus, the coolant spills on the work table between the tool head and chuck assemblies with the result that the work table tends to warp or buckle due to the local change in temperature. This causes the tool head assembly to become misaligned with the chuck assembly introducing machining errors in an operation where precision surfaces are a basic requirement.

We have solved this problem. Any warpage of the work table 18 as a result of being locally cooled in the region between the tool head assembly and spindle unit will not appreciably affect the relative positioning of the seal stock 36 and tool holder 46 because the table mounting connections for these elements are located close together in the affected region of table 18. Furthermore, the coolant that is discharged from the nozzle 76 and spun off the seal stock during machining is not allowed to fall on any portion of the work table and particularly the portion between the tool head assembly and the spindle unit.

It will be noted that the entire surface of the cold air basin 82 is covered with insulation material 94 to minimize thermal loss. This material is made of alternate layers of aluminum foil and woven fiberglass sheets and has a heat conductivity in the order of $10^{-4}$ B.t.u./hr./ft.$^2$/hr. Of course any suitable insulation material insulation material may be used, but the heat conductivity should be as low as possible. It may be seen by inspection that the other parts of the cooling system are also covered with this insulation. Clearly, work table 18 will be maintained throughout its area at an even temperature and as a result, this unusual machining operation can be carried out to the same degree of perfection as would be the case with a normal metal lathe working at room temperature.

A further point with regard to the cold air basin 82 must be explained. As before indicated, the object is to cool a normally elastic rubber-like material to the point where it becomes rigid and capable of being machined with accuracy. Obviously heat is introduced into the stock by the machining operation and for this reason, coolant is applied directly at the tool contact point. However, it is important to realize that any given portion of the seal stock will be cooled directly under the nozzle 76 for only a brief moment and during the majority of each revolution it will be exposed to room temperature making uniform temperature control throughout the stock area difficult.

Realizing this, it may be observed that the top surface 99 of the generally vertical wall portion of the cold air basin 82 surrounds the seal stock 36 in a plane above it. Hence, the shape of the cold air basin is not only designed to collect the coolant being thrown off by the rotating stock, but provides a cold air atmosphere in sufficient depth fully surrounding the seal stock to insure that it is maintained at an even machining temperature. The fact that cold air is heavier than warm air and seeks out low places will sufficiently serve to explain the principle involved. This construction also keeps most of the cold air drafts off of the critical portion of the work table 18.

In operation, an operator places the seal stock 36 in the chuck 35. The start button on the control panel 60 is depressed energizing the motor 22 which drives the spindle 16 and the speed is adjusted by the speed control wheel 26. Next, a ram-in control button is depressed energizing the pneumatic cylinder 45 which brings the primary slide 40 over against the primary tool stop 52 indexing the tool holder 46 roughly over the spinning seal stock. The tool head stop 55 is rotated 90° from the position shown so that the two opposite flat faces 101 and 102 are adjacent the stops 103 and 104 respectively. The secondary slide 42 is then adjusted until stop 104 is engaged by face 102. By pressing the spindle advance button the operator causes the spindle quill 31 to rise a predetermined distance lifting the chuck 35 into a tool bit adapted for cutting the outside seal diameter. The spindle advance control stops 32 are previously adjusted to control depth of the cut. By depressing a spindle retract button the spindle is lowered to clear the tool area. The operator then rotates the crank 57 reversely until the opposite face 101 of the tool stop 55 rests against the stop 103 positioning a tool above the stock for cutting the inside diameter. Again the spindle advance is depressed and the operation of the spindle is repeated. At this point the seal stock has an inside diameter and an outside diameter. The seal lip and spring groove may then be formed on the inner and outer diameters respectively by rotating the tool head stop 55 back to the position shown and repeating the above steps with cutting tools adapted for this purpose.

From the foregoing, it may be appreciated that the final seal shape is reached without a subsequent trimming operation and though the seal stock is originally somewhat oversized, there is less scrap or waste in machining the elastomer in the "frozen" condition than that which accompanies the previously described method of molding and then cutting off excess rubber with a knife. Furthermore, precision surfaces of revolution are formed which are concentric to the case due to the lathe principle employed.

While we have described a specific lathe embodiment and a cooling system therefor, it may be readily appreciated that various changes could be made by persons skilled in machinery design; for example, a fully automated apparatus of some other type, such as a boring machine, may be envisioned without departing from the spirit of the invention as described in the appended claims.

What is claimed is:
1. A lathe for machining elastomeric stock comprising, in combination, a source of coolant at below ambient temperature, support means, a chamber mounted on said support means, means located within said chamber for holding elastomeric stock to be machined, means for rotating said holding means, means mounted on said support means for machining the elastomeric stock mounted on said holding means, means conveying coolant to the elastomeric stock to be machined for cooling the stock to an inelastic state, means including said chamber for collecting the coolant conveyed to the elastomeric stock, means for returning the coolant so collected to the source, and means insulating the support means from the chamber, the collecting means and the returning means to maintain the support means at substantially ambient temperature.

2. A lathe as recited in claim 1 and including filter means located in said collecting means to prevent foreign particles from entering the source.

3. A lathe for machining elastomeric stock comprising, in combination, support means, a source of coolant at below ambient temperature and insulated from said support means, a chamber mounted on said support means, means located within said chamber for holding elastomeric stock to be machined, means rotating said holding means about a substantially vertical axis, means mounted on said support means for machining elastomeric stock mounted on said holding means, means conveying coolant to the elastomeric stock to be machined for cooling the stock to an inelastic state, means including said chamber for collecting the coolant conveyed to the elastomeric stock, means for returning the coolant so collected to the source, and means insulating the support means from the chamber, the collecting means and the returning means to maintain the support means at substantially ambient temperature.

4. A lathe for machining elastomeric stock comprising, in combination, support means, a reservoir containing coolant at below ambient temperature and insulated from said support means and including, a main compartment, a cold compartment communicating with said main compartment, and a return compartment adjacent said cold compartment and having fluid communication therewith, refrigeration means disposed within said cold compartment, a chamber mounted on said support means, means located within said chamber for holding elastomeric stock to be machined, means for rotating said holding means, means mounted on said support means for machining elatsomeric stock mounted on said holding means, means conveying coolant from said reservoir to the elastomeric stock to be machined for cooling the stock to an inelastic state, means including said chamber for collecting the coolant conveyed to the elastomeric stock, means for returning the coolant so collected to said return chamber, and means insulating the support means from the chamber, the collecting means and the returning means to maintain the support means at substantially ambient temperature.

5. A lathe as recited in claim 1 and wherein said chamber is shaped so that it provides a relatively deep cold air basin around the elastomeric stock to maintain the entire stock at a uniform machining temperature.

6. A lathe for machining elastomeric stock comprising, in combination, a source of coolant at below ambient temperature, support means, a basin mounted on said support means, means located within said basin for holding elastomeric stock to be machined, means conveying coolant to the elastomeric stock to be machined for cooling the stock to an inelastic state, means rotating said holding means about a substantially vertical axis, means mounted on said support means for machining the elastomeric stock, said machining means being located above and closely adjacent to said holding means so that any local cooling of the support means by said coolant will not appreciably affect the relative positions of said machining means and said holding means, and means including said basin for collecting the coolant conveyed to the elastomeric stock.

7. A lathe for machining elastomeric stock comprising, in combination, a source of coolant at below ambient temperature, support means, a basin mounted on said support means, means located within said basin for holding elastomeric stock to be machined, means conveying coolant to the elastomeric stock to be machined for cooling the stock to an inelastic state, said coolant establishing a cold air atmosphere within said basin to maintain the stock in an inelastic state, means for rotating said holding means, means mounted on said support means for machining the elastomeric stock, said machining means being located above and closely adjacent to said holding means so that any local cooling of the support means by said coolant will not appreciably affect the relative positions of said machining means and said holding means, means including said basin for collecting the coolant conveyed to the elastomeric stock, and means for maintaining said coolant at a predetermined temperature.

References Cited by the Examiner
UNITED STATES PATENTS

| | | |
|---|---|---|
| 2,129,815 | 9/1938 | Bullard. |
| 2,182,952 | 12/1939 | Todd et al. |
| 3,012,455 | 12/1961 | Kline. |
| 3,078,560 | 2/1963 | Vosburg _____ 9—11.3 X |

WILLIAM W. DYER, Jr., *Primary Examiner.*

DONALD R. SCHRAN, *Examiner.*